April 12, 1966     O. F. ECKLUND     3,245,115

THERMOPLASTIC ACCUMULATOR

Filed Nov. 29, 1963

INVENTOR.
OSCAR FREDERICK ECKLUND

BY *Leonard R. Kohan*

ATTORNEY

United States Patent Office 3,245,115
Patented Apr. 12, 1966

3,245,115
THERMOPLASTIC ACCUMULATOR
Oscar Frederick Ecklund, Barrington, Ill., assignor to American Can Company, New York, N.Y., a corporation of New Jersey
Filed Nov. 29, 1963, Ser. No. 327,583
10 Claims. (Cl. 18—12)

This invention relates to an accumulator for molten thermoplastic resin and more particularly to an accumulator having "no dead spots" where the molten thermoplastic resin may collect. The accumulator is generally used in conjuction with a thermoplastic molding apparatus.

The purpose of an accumulator is to store material, continuously or semi-continuously supplied to it, and then deliver the material intermittently, as needed, to satisfy a process. In blow molding, the accumulator serves two principal functions: (1) the accumulation of thermoplastic and periodic delivery of the accumulated thermoplastic to one or more extrusion dies to rapidly extrude the parisons from which the final parts are blown and, (2) the delivery of the thermoplastic, as described in (1), but at variable rates or pressures, resulting in controlled variable thickness along the parison to control material distribution in the blown part.

Some difficulty has been encountered in the molding of certain thermoplastics. This has been especially true in the blow molding of vinyl bottles, principally due to the heat instability of the vinyl thermoplastic.

When extrusion of vinyl is attempted, particularly when multiple parisons are extruded, an unstable condition is encountered such that if the flow path slows, the plastic in that path or area becomes more viscous, causing a further reduction in flow. At the same time, flow through the unrestricted path tends to become still more rapid. This tendency of the material to stop flowing and to collect in "dead spots" causes serious consequences.

Two of the consequences most encountered in the molding of vinyl is the tendency of the vinyl to change viscosity according to its heat history, and the sensitivity of the vinyl to heat. Excessive heating results in decomposition of the vinyl thermoplastic, with the production of hydrochloric acid. It is apparent that such decomposition would have serious adverse effects upon a molding operation.

It is therefore an object of the invention to provide an accumulation apparatus which will have the least internal interference to the flow of molten thermoplastic through the apparatus.

Another object of the present invention is to provide a thermoplastic accumulator which may be easily adapted to presently used commercial bottle blowing equipment.

A further object of the present invention is to provide a thermoplastic accumulator, without internal valving, which will furnish a uniform supply of molten thermoplastic resin to a molding apparatus.

Numerous other objects and advantages of the present invention will be apparent as it is better understood from the following description, which, taken in connection with the accompanying drawings, discloses a preferred embodiment thereof.

Referring to the drawings.

The above objects are accomplished by providing an accumulator for the intermittent discharge of the molten thermoplastic, the accumulator being substantially continually supplied and filled with the thermoplastic. A uniform supply of the molten thermoplastic is provided by the accumulator without the necessity for internal valving within the accumulator. The accumulator comprises a hollow infeed cylinder into one end of which is extruded molten thermoplastic and a hollow outfeed cylinder spaced from the first cylinder. Connecting both cylinders is a double-ended reciprocating plunger having an unobstructed passage therethrough. Each of the opposite ends of the plunger slidably interfits with one of the hollow cylinders. Means are provided for reciprocating the plunger, which causes a variation in the internal volume of the accumulator whereby the displacement in the cylinders by the plunger causes the molten thermoplastic to flow from the infeed cylinder through the plunger passage into the outfeed cylinder, and then to be discharged from the outfeed cylinder.

Figure 1:
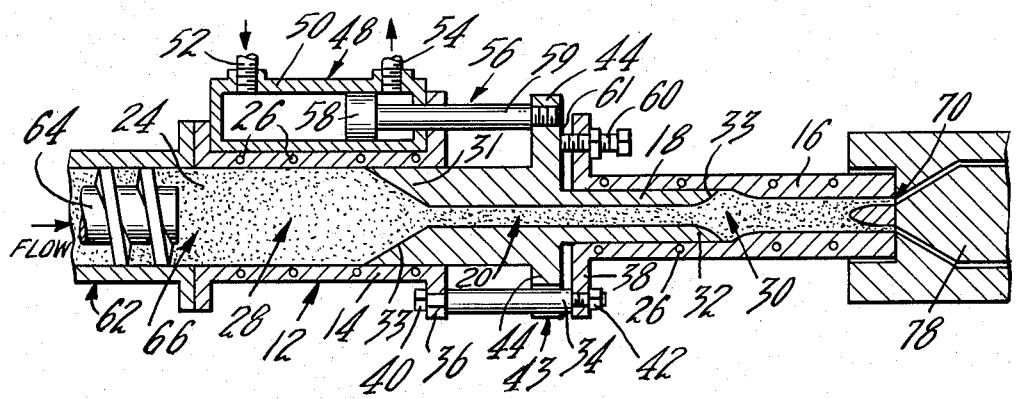
FIGURE 1 is a sectional view illustrating a molten thermoplastic accumulator.
Figure 2:
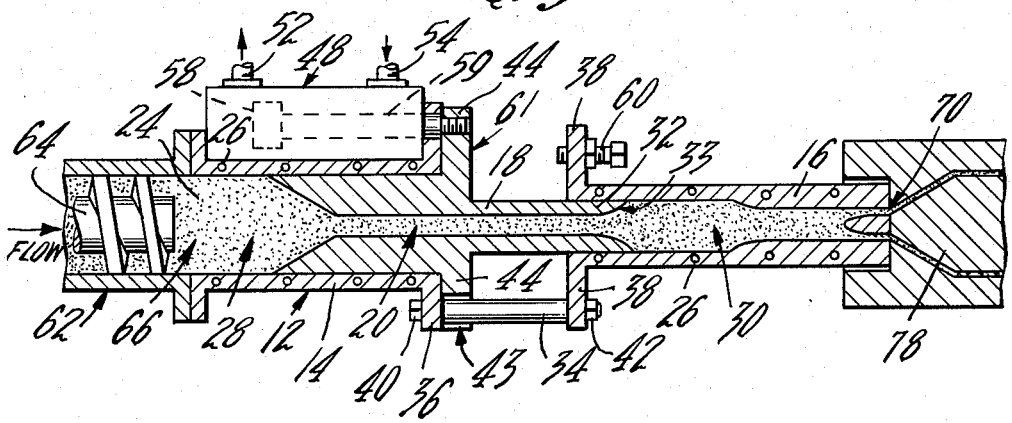
FIG. 2 is a sectional view, similar to FIG. 1, illustrating the position of the accumulator plunger during discharging of the molten thermoplastic.

As a preferred or exemplary embodiment of the instant invention, FIGURES 1 and 2 illustrate an accumulator for molten thermoplastic, generally designated 12. The accumulator comprises a hollow infeed cylinder 14, a hollow outfeed cylinder 16, and a plunger 18 having an unobstructed passage 20 therethrough. Each end of the plunger 18 slidably interfits with, and connects the two cylinders 14 and 16, all three lying on substantially the same axis.

In order to maintain thermoplastic 24 within the accumulator 12 in a molten condition, both cylinders 14 and 16 are provided with heating means, such as resistance heaters 26. Other heating methods, such as external ring heaters surrounding the cylinders, may also be utilized. Heating is generally necessary since thermoplastics as linear polyethylene are maintained between 350° and 450° F. during molding, while the temperature for molding unplasticized vinyl is about 340° to 425° F.

Both cavities 28 and 30, within the infeed and outfeed cylinders 14 and 16, respectively, are free from internal obstructions to deter the collection of "hang-up" of thermoplastic 24.

The infeed cavity 28 has a cross-section less than the cross section of the outfeed cavity 30. The difference in cross-sectional area is necessary but it is not important which cylinder has the greater cross-sectional area. It is important only that the two in-line cylinders 14, 16 be different in diameter.

Connecting both the infeed and outfeed cylinders 14, 16, each end 31, 32 of the plunger 18 slidably fits into one of the hollow cylinders. Thus the outside diameter of each end 31, 32 of the plunger 18 will have a diameter slightly less than the diameter of the cylinder cavity with which it mates. The slidable engagement is such that a negligible amount of molten thermoplastic 24 can escape from within the accumulator 12.

In the preferred embodiment, both ends 31, 32 of the connecting plunger 18 slidably fit within one of the hollow cylinders. However, either one or both of the ends 31, 32 may slidably fit about their respective mating cylinder ends, so long as the variance in cross-section of the infeed and outfeed cylinders 14, 16 is maintained.

The primary function of the plunger 18 is to vary the internal volume of the accumulator 12 as the plunger 18 reciprocates, thereby regulating the discharge of thermoplastic 24 from the accumulator. Thus the plunger 18 serves both to connect the cylinders 14, 16 and to vary the internal volume of the accumulator 12.

The passage 20, within the plunger 18, provides an unobstructed path for the thermoplastic 24 to flow from the infeed cylinder 14 to the outfeed cylinder 16. Although the length of the passage 20 is not critical, it is essential that the minimum passage cross-section be less than the cross-section of at least one of the cylinder cavities 28, 30. This relationship of the cross-sections will be more fully explained hereinafter.

In order to minimize any resistance to the flow of molten thermoplastic 24 within the accumulator 12, an internal champfer 33 is formed on each end of the plunger 18. In certain cases it may be desirable to impart a slight curve at the end of the champfer 33 to further reduce resistance to the flow of thermoplastic 24.

The positioning of the two cylinders 14 and 16 relative to each other, is maintained by appropriate means such as a shaft 34, which is secured to lower flanges 36, 38 between the cylinders 14, 16 by a bolt 40 and a nut 42. The shaft 34 also serves as a guide for movement of the plunger 18 between the cylinders 14, 16. A slot 43, within a rib 44, integral with the plunger 18 through which the shaft 34 rides, prevents rotary movement of the plunger 18 with relation to the cylinders 14, 16, during reciprocation of the plunger 18.

Actuation and reciprocation of the plunger 18 is provided by suitable cylinder and piston means, generally designated 48. The cylinder and piston means 48 comprises a body 50 secured to the exterior of the accumulator 12, with ports 52, 54 leading to a suitable source of power, such as a hydraulic system, not shown; a member, generally designated 56, having a piston 58 secured to one end and located within the body 50; and a stem 59 threadably secured to the rib 44 of the plunger 18.

The stroke of the plunger may be controlled by suitable gauging means such as an adjustment screw 60 threadably inserted into the flange 38 and abutting against the face 61 of the rib 44 to limit the stroke in one direction. In the other direction the stroke is limited, and the plunger 18 stopped, by the flange 36. Of course, the length of the screw 60 may be varied to obtain the exact magnitude of stroke desired.

In operation, an extruder 62, having an internal screw 64, continually feeds the molten thermoplastic resin 24 into an open end 66 of the infeed cylinder 14. The extruder 62 abuts the end 66 so that the thermoplastic resin 24 will flow directly into the accumulator 12. Thus, the accumulator 12 is constantly filled with molten thermoplastic 24 and a positive flow pressure is maintained by the continual feeding of thermoplastic 24 from the extruder 62 into the accumulator 12.

As shown in FIGURE 1, the plunger 18 is shifted toward the outfeed cylinder 16 as the accumulator 12 is being filled with molten thermoplastic 24. With the plunger 18 in this position, the maximum volume of the infeed cylinder cavity 28 is obtained. When the plunger 18 is shifted as far as it will go towards the outfeed cylinder 16, the maximum capacity of the entire accumulator 12 is also realized.

Once the entire accumulator 12 has been filled with molten thermoplastic 24 it is ready to be utilized in conjunction with a suitable molding apparatus, not shown, such as an extrusion bottle blowing unit or an injection molding unit, or other molding apparatus well known in the art.

As the plunger 18 moves toward the infeed cylinder 14, the volume of the infeed cylinder 14 decreases and the volume of the outfeed cylinder 16 increases. However, since the cross-section of the infeed cavity 28 is greater than the cross-section of the outfeed cavity 30, the overall internal volume of the accumulator is decreased.

As the internal volume of the accumulator 12 decreases and the extruder 62 continues feeding molten thermoplastic 24 into the infeed cylinder 14, thermoplastic 24 is forced through the passage 20 and out of an open end 70 of the outfeed cylinder 16. The thermoplastic 24 then passes around a torpedo 78 to an extrusion die or goes to a manifold (not shown) to supply multiple extrusion dies.

The quantity of thermoplastic 24 discharged from the accumulator 12 is substantially proportional to the difference in displacement of the plunger 18 within the infeed cylinder 14 and the outfeed cylinder 16. By means of the adjustment screw 60, which regulates the magnitude of the plunger stroke, the quantity of thermoplastic 24 discharged during each cycle of the plunger 18 may be closely controlled. Some compression of the plastic is encountered and the capacity of the accumulator must be large enough to compensate for this.

In another form of the invention (FIG. 3), an accumulator 82 has two substantially parallel hollow infeed and outfeed cylinders, 84 and 86, respectively, connected at adjacent ends 88, 89 by a double-ended reciprocable plunger 90, substantially U-shaped in configuration.

A suitable means, such as a hydraulic system, synchronized with the molding apparatus with which the accumulator 82 operates, reciprocates the plunger 90. Secured to flanges 91, which are in turn integral with the plunger 90, are shafts 93. These shafts 93 are operated by the aforementioned reciprocating means to move the plunger 90.

Suitable heating of the accumulator, such as resistance heaters 94, is provided to maintain the thermoplastic 24 within the accumulator 82 in the molten state.

Connecting a cavity 95, within the infeed cylinder 84 to a cavity 96 within the outfeed cylinder 86, is an unobstructed passage 100 within the plunger 90.

One end 102 of the plunger 90 slidably interfits with the end 88 of the infeed cylinder 84, while the other end 104 of the plunger 90 slidably interfits with the end 89 of the outfeed cylinder. As in the aforementioned form of the invention, the slidable engagement is such that no molten thermoplastic 24 can escape from within the accumulator 82.

As shown, the plunger end 102 fits within the infeed cylinder 84 and the outfeed cylinder end 89 fits within the plunger end 104. Although the cross-section of the infeed cylinder cavity 95 is shown greater than the cross-section of the outfeed cylinder cavity 96, either cross-section may be greater than the other, or they may be equal. Thus only one or both of the plunger ends 102, 104 may fit within the cylinder ends 88, 89. Alternatively, both ends 88, 89 may fit within the plunger ends 102, 104.

It therefore follows that the cross-section of the passage 100 will depend upon the manner of fitting the ends 102, 104 of the plunger 90 with the ends 88, 89 of the cylinders 84, 86. This cross-section will generally depend upon quantity of thermoplastic 24 that is to be discharged from the accumulator 82 during each cycle of its operation. Preferably the cross-section of the passage 100 is substantially uniform, although it may vary if desired.

In order to minimize resistance to the flow of molten thermoplastic 24 within the accumulator 82, the ends 102 and 89 are champfered. Should the interfitting of the plunger ends 102, 104 and the cylinder ends 88, 89 vary, as described hereinbefore, the particular ends champfered may also vary accordingly.

Figure 3:
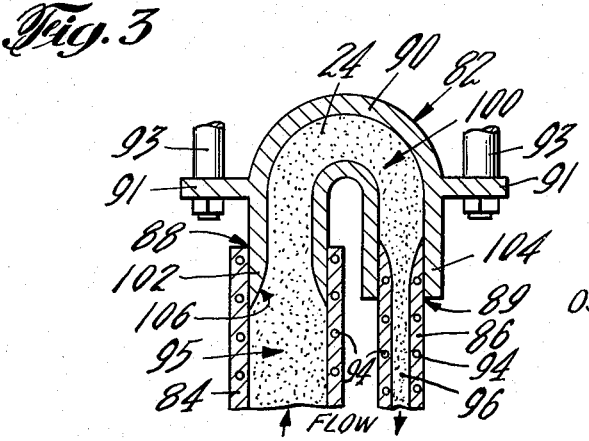
FIG. 3 is a patrial sectional view showing a modified form of the invention.

During operation of the accumulator 82, a continuous flow of molten thermoplastic resin 24 is fed into the cylinder 84 from a suitable source, such as an extruder as hereinbefore described. With the plunger 82 in the extreme raised position away from the cylinders 84, 86, as shown in FIG. 3, the capacity or internal volume of the accumulator 82 is at a maximum.

Once the accumulator 82 is filled with molten thermoplastic 24, the plunger 90 is lowered toward the cylinders 84, 86 and the internal volume of the accumulator 82 is decreased. Thus the volume of thermoplastic 24 in excess of the capacity of the accumulator 82 is discharged from the outfeed cylinder 86, since the positive pressure of the thermoplastic 24 being fed into the infeed cylinder 84 prevents the movement of molten thermoplastic back into the infeed cylinder 84.

The quantity of thermoplastic discharged from the accumulator 82 is substantially equal to the sum of the displacement of the plunger 90 with both the infeed cylinder 84 and the outfeed cylinder 86.

In the preferred embodiment, the flow of thermoplastic into the accumulator is sufficiently positive so that no valves are required between the source of molten thermoplastic and the accumulator to prevent a backward flow of the plastic when the accumulator discharges. Also, the resistance to flow of plastic on the discharge side of the accumulator will be sufficiently high so that there will be no flow out of the discharge end as the accumulator charges.

However, there are applications where it may be desirable to eliminate any possible back flow into the source of thermoplastic during the discharge stroke of the accumulator. This may be accomplished by suitable valving, such as a check valve, between the source of molten thermoplastic and the accumulator.

Likewise, it may be desirable to precompress the plastic in the accumulator or to prevent possible leakage of plastic from the discharge end of the accumulator. This can be accomplished with a suitable valve located on the discharge end of the accumulator.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

I claim:

1. An accumulator for intermittent discharge of molten thermoplastic, said accumulator being substantially continually supplied and filled with said thermoplastic and said accumulator providing a uniform supply of said thermoplastic without internal valving of said accumulator, comprising:
   a hollow infeed cylinder into one end of which is extruded molten thermoplastic;
   a hollow outfeed cylinder spaced from said first cylinder;
   a double-ended reciprocating plunger, having an unobstructed continuously open passage therethrough, connecting said cylinders, with each of the opposite ends of said plunger slidably interfitting with one of said hollow cylinders;
   means for reciprocating said plunger; and plunger means for varying the internal volume of said accumulator, whereby the displacement of said plunger with said cylinders causes said molten thermoplastic to flow from said infeed cylinder through said plunger passage into said outfeed cylinder and then to be discharged from said outfeed cylinder.

2. The accumulator of claim 1 wherein said infeed cylinder, said outfeed cylinder, and said plunger lie on substantially the same axis.

3. The accumulator of claim 2 wherein the minimum internal diameter of said passage within said plunger is less than the internal diameter of either of said cylinders.

4. An accumulator for the intermittent discharge of molten thermoplastic, said accumulator being substantially continually supplied and filled with said thermoplastic and said accumulator providing a uniform supply of said thermoplastic without internal valving of said accumulator, comprising:
   a hollow infeed cylinder into one end of which is continually extruded said molten thermoplastic;
   a hollow outfeed cylinder spaced from and substantially parallel to said infeed cylinder;
   a double-ended substantially U-shaped reciprocating plunger, having an unobstructed passage therethrough, connecting said cylinders;
   each of the opposite ends of said plunger slidably interfitting with an end of one of said hollow cylinders;
   and means for reciprocating said plunger whereby movement of said plunger away from said cylinders increases the internal volume of said accumulator and movement of said plunger toward said cylinders decreases the internal volume of said accumulator thereby causing a quantity of molten thermoplastic to be discharged from said outfeed cylinder, said quantity being substantially equal to the sum of the displacement of said plunger with both said infeed and outfeed cylinders.

5. The accumulator of claim 4 wherein at least one end of said plunger, slidably interfitting with one of said cylinders, engages said cylinder around said plunger's outer circumference.

6. The accumulator of claim 4 wherein the inside diameter of said passage within said plunger is greater than the outside diameter of at least one of said cylinders.

7. The accumulator of claim 4 wherein the internal cross-sections of said infeed and outfeed cylinders differ.

8. The accumulator of claim 4 wherein the internal cross-sections of said infeed and outfeed cylinders are substantially equal.

9. An accumulator for intermittent discharge of molten thermoplastic, said accumulator being substantially continually supplied and filled with said thermoplastic and said accumulator providing a uniform supply of said thermoplastic without internal valving of said accumulator, comprising:
   a hollow infeed cylinder into one end of which is continually extruded said molten thermoplastic;
   a hollow outfeed cylinder spaced from and co-axial with said infeed cylinder, the internal cross-section of said infeed cylinder being greater than the internal cross-section of said outfeed cylinder;
   a double-ended reciprocating plunger, having an unobstructed passage therethrough connecting said cylinders and substantially coaxial therewith, said passage being continuously open to said infeed and outfeed cylinders for movement of said thermoplastic therebetween;
   each of the opposite ends of said plunger slidably interfitting with an end of one of said hollow cylinders;
   and means for reciprocating said plunger between said cylinders whereby movement of said plunger toward said outfeed cylinder results in a large increase in the volume of said infeed cylinder and a smaller decrease in the volume of said outfeed cylinder, with the total accumulation of thermoplastic in said infeed cylinder being the difference between said volumes, and movement of said plunger toward said infeed cylinder decreases the internal volume of said accumulator thereby causing a quantity of thermoplastic to be discharged from said outfeed cylinder, the quantity of thermoplastic discharged from said accumulator being substantially proportional to the difference in displacement of said plunger with said infeed and outfeed cylinders.

10. The accumulator of claim 9 wherein the internal cross-section of said plunger passage is less than the internal cross-section of either of said cylinders.

References Cited by the Examiner

UNITED STATES PATENTS

| | | | |
|---|---|---|---|
| 3,020,591 | 2/1962 | Breher et al. | 18—12 X |
| 3,129,465 | 4/1964 | Poyner | 18—30 |
| 3,169,275 | 2/1965 | Compton et al. | 18—12 X |

WILLIAM J. STEPHENSON, *Primary Examiner.*

J. SPENCER OVERHOLSER, *Examiner.*

L. S. SQUIRES, *Assistant Examiner.*